K. RUSHTON.
COUNTERBALANCE FOR LOCOMOTIVE DRIVING WHEELS.
APPLICATION FILED APR. 9, 1919.
1,310,136.
Patented July 15, 1919.
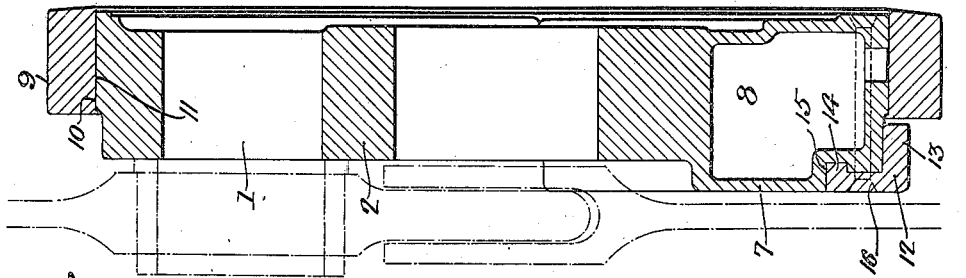
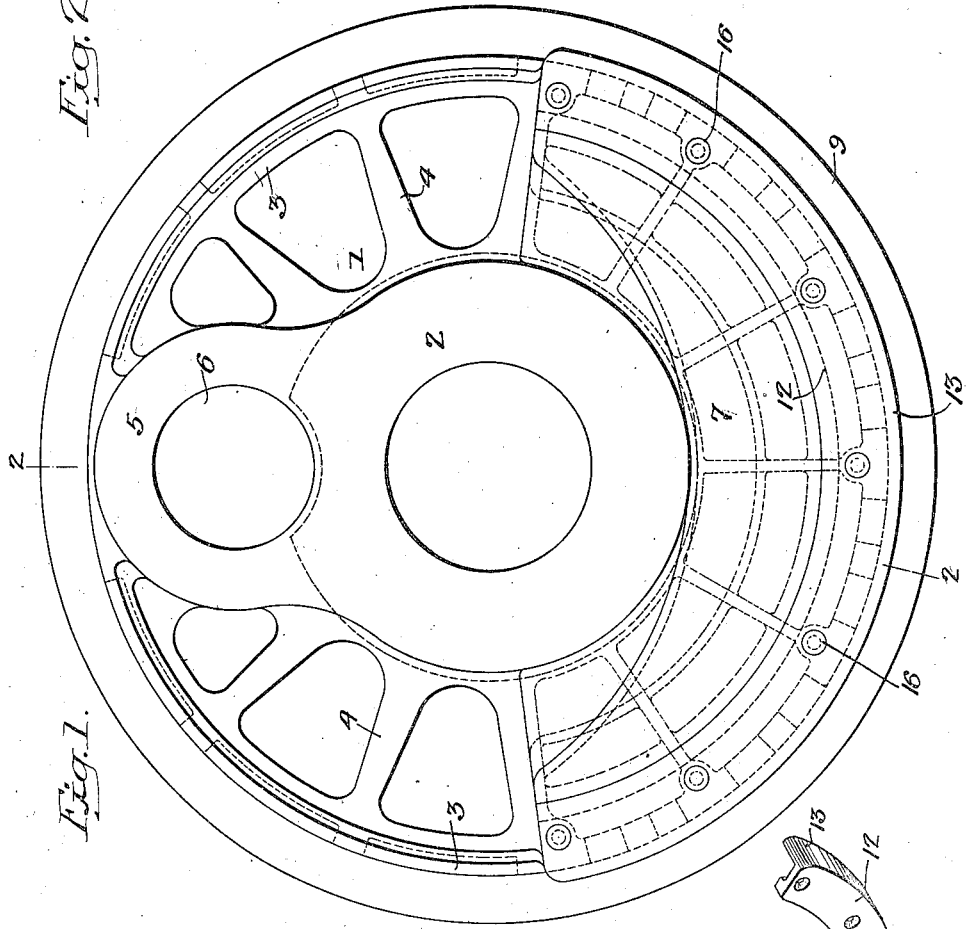

UNITED STATES PATENT OFFICE.

KENNETH RUSHTON, OF PHILADELPHIA, PENNSYLVANIA, ASSIGNOR TO THE BALDWIN LOCOMOTIVE WORKS, OF PHILADELPHIA, PENNSYLVANIA, A CORPORATION OF PENNSYLVANIA.

COUNTERBALANCE FOR LOCOMOTIVE DRIVING-WHEELS.

1,310,136.     Specification of Letters Patent.     Patented July 15, 1919.

Application filed April 9, 1919. Serial No. 288,730.

*To all whom it may concern:*

Be it known that I, KENNETH RUSHTON, a citizen of the United States, residing in Philadelphia, Pennsylvania, have invented certain Improvements in Counterbalances for Locomotive Driving-Wheels, of which the following is a specification.

My invention relates to certain improvements in counterbalances for the driving wheels of locomotives and particularly those having detachable tires.

The object of my invention is to increase the weight of the counterbalance by extending it beyond the body portion of the wheel and to make it detachable so that it can be removed when it is necessary to detach the tire from the body portion when renewals are necessary.

In the accompanying drawings:

Figure 1 is a side view of a locomotive driving wheel showing my improved counterbalance in place;

Fig. 2 is a sectional view on the line 2—2 Fig. 1; and

Fig. 3 is a perspective view of the detachable counterbalance.

1 is the body of the wheel having a hub 2, a rim 3 and spokes 4, in the present instance. The hub is extended, as at 5, and is bored at 6 for the reception of the pin to which the connecting, or parallel, rod is attached. 7 is the fixed portion of the counterbalance, which is opposite the projection 5. This portion is made hollow, as at 8, in the present instance. 9 is a tire which is forced onto the body portion 1 of the wheel from the outer side thereof until a lip thereon engages the body portion so that the tire can only be forced onto the body of the wheel from the outside.

Heretofore, it has been the usual practice to discontinue the counterbalance within the line of the tire so that the counterbalance would not interfere with the removal of the tire when necessary, but in very large locomotives additional counterbalance is necessary and this counterbalance cannot be extended laterally on the inside or on the outside of the wheel, as, in one case, it would interfere with the frame, and, in the other case, with the connecting, or parallel, rod.

By my invention, however, I gain the additional weight by extending the counterbalance beyond the periphery of the body portion of the wheel so as to overlap the tire. 12 is the detachable section of the counterbalance made as shown in Fig. 3, and having a portion 13 which extends beyond the periphery of the body portion 1 of the wheel and overlaps the tire 9. I preferably form an internal rib 14 on the detachable counterbalance 12, which is adapted to a recess 15 in the body of the wheel and is secured to the wheel by a series of rivets 16, or other fastenings. The heads of the rivets are countersunk, in the present instance, so that they will be flush with the surface of the wheel and counterbalance. By this construction a considerable weight can be added to the counterbalance without increasing the width of the wheel and the section 12, being detachable, can be removed when necessary so as to allow for the removal of the rim 9, which is forced off of the body portion in the direction of the counterbalance.

It will be understood that the tire can be plain, as shown, or can be flanged, as some driving wheels of a locomotive are plain, while others are flanged.

I claim:

1. A driving wheel for a locomotive having a removable tire and having a detachable counterbalance extending beyond the periphery of the body portion of the wheel and overlapping the tire so that on the removal of the counterbalance the tire can be detached from the wheel.

2. The combination in a locomotive driving wheel, of a body portion having a hub, rim and spokes, and having a segmental groove; a tire forced onto the body portion; and a detachable counterbalance having a portion extending beyond the body of the wheel and overlapping the tire and having a flange extending into the groove of the wheel; and means for attaching the counterbalance to the body of the wheel.

3. The combination in a locomotive driving wheel, of a body portion having a hub, rim and spokes, and having an extension to receive the crank pin and having opposite to the crank pin a portion of the counterbalance made integral with the wheel; a tire mounted on the body portion; and a detachable section forming an extension of the integral counterbalance and detachably secured to the body portion of the wheel so that it can be removed when necessary to remove the worn tire.

In witness whereof I affix my signature.

KENNETH RUSHTON.